(12) United States Patent
Won

(10) Patent No.: US 10,377,214 B2
(45) Date of Patent: Aug. 13, 2019

(54) SYSTEMS, APPARATUS, AND METHODS FOR FACILITATING THE REMOVAL OF SNOW FROM A VEHICLE

(71) Applicant: Haion Won, Winter Garden, FL (US)

(72) Inventor: Haion Won, Winter Garden, FL (US)

( * ) Notice: Subject to any disclaimer, the term of this patent is extended or adjusted under 35 U.S.C. 154(b) by 163 days.

(21) Appl. No.: 15/432,591

(22) Filed: Feb. 14, 2017

(65) Prior Publication Data
US 2017/0197501 A1    Jul. 13, 2017

Related U.S. Application Data

(63) Continuation-in-part of application No. 14/753,148, filed on Jun. 29, 2015, now abandoned, which is a continuation-in-part of application No. 14/547,375, filed on Nov. 19, 2014, now abandoned.

(51) Int. Cl.
*B60J 11/04* (2006.01)

(52) U.S. Cl.
CPC .................... *B60J 11/04* (2013.01)

(58) Field of Classification Search
CPC ....................................... B60J 11/04
USPC ................................................. 150/166
See application file for complete search history.

(56) References Cited

U.S. PATENT DOCUMENTS

| | | | | |
|---|---|---|---|---|
| 2,803,282 | A * | 8/1957 | Wilcox | B60J 11/00 150/166 |
| 5,161,849 | A * | 11/1992 | Holland, Jr. | B60J 11/00 116/28 R |
| 5,242,205 | A * | 9/1993 | Garner | B60J 11/00 150/166 |
| 5,697,416 | A * | 12/1997 | Bock | B60J 11/08 150/168 |
| 6,070,629 | A * | 6/2000 | Whiteside | B60J 11/00 150/166 |
| 6,220,648 | B1 * | 4/2001 | Daniel | B60J 11/00 296/136.02 |
| 2005/0260902 | A1 * | 11/2005 | Geier | B63B 21/48 441/74 |
| 2005/0275242 | A1 * | 12/2005 | McNamee | B60J 11/00 296/136.01 |
| 2007/0085372 | A1 * | 4/2007 | Dhanray | B60J 11/00 296/136.07 |
| 2013/0276286 | A1 * | 10/2013 | Latuff | B60J 11/06 29/428 |
| 2014/0167444 | A1 * | 6/2014 | DiDato | B60J 11/04 296/136.07 |
| 2016/0090029 | A1 * | 3/2016 | Levytsky | B60J 11/04 340/473 |

* cited by examiner

*Primary Examiner* — Sue A Weaver

(57) ABSTRACT

An apparatus includes a first sheet having one or more holes are arranged proximate each corner. First, second, third, and fourth connecting cords, each connecting cords including an elastic band and first and second hooks, are used to secure the first sheet to a vehicle in such a manner as to cover portions of the hood, front windshield, and roof of the vehicle. A second sheet is used in a similar manner to cover the rear portions of the vehicle. After snow accumulates on the vehicle, a person standing in front of the vehicle may easily remove the first sheet (and snow thereon) by pulling the first sheet toward the front of the vehicle. The second sheet (and snow thereon) may be removed in a similar manner.

1 Claim, 16 Drawing Sheets

SYSTEMS, APPARATUS, AND METHODS FOR FACILITATING THE REMOVAL OF SNOW FROM A VEHICLE

CROSS-REFERENCE

This application is a continuation-in-part application of Ser. No. 14/753,148, filed Jun. 29, 2015, which is incorporated herein by reference in its entirety and to which application we claim priority under 35 USC § 120.

This application claims the benefit of Ser. No. 14/547,375 filed on Nov. 19, 2014 under 35 USC § 365.

BACKGROUND OF THE INVENTION

In northern climates, snow accumulation on vehicles poses significant problems during winter months. Removing snow from a vehicle is time-consuming and requires physical exertion. Typically, simple tools such as brushes and scraping devices are used to remove snow from the roof, windshield, hood, etc., of a vehicle. However, when the accumulation is heavy, using such tools to remove snow can be difficult and even dangerous for many people. For example, if one foot of snow (or more) accumulates on a vehicle, and the ground around the vehicle is icy, a person attempting to scrape the snow off the vehicle risks slipping and falling, or over-exerting himself. A person who is relatively weak or frail may be unable to remove the snow under such conditions.

As described herein, the present invention clears snow off a vehicle with relatively small amount of force, enabling a person who is relatively weak or frail to remove the snow. The present invention utilizes thin sheets made with very light material. The sheets of the present invention are designed to stay very close to the surface of a vehicle as the sheets are laid on the surface of a vehicle to take advantage of streamlined shape of a vehicle in clearing the snow off the vehicle. The sheets of the present invention clear snow by utilizing gravity and the streamlined shape of a vehicle, and thus result in using less force in clearing the snow than simply using the force alone.

Modern vehicles are designed to have streamlined shape to reduce the drag caused by air resistance. The roof of a vehicle, which appears to be flat to human eyes, is slightly angled to reduce the drag. The present invention is designed to utilize the angled surface of a vehicle.

U.S. Pat. No. 5,292,167 describes a windshield snow cover. The present invention described herein is distinctly different from the snow cover of the '167 patents or any other commercially available windshield snow cover. For example, the windshield cover can only remove snow on the windshield while various embodiments of the present invention remove snow from the entire vehicle. The amount of snow cleared by various embodiments of the present invention is about 8 times more than a windshield snow cover may be able to remove.

In one embodiment, the sheets of the present invention are placed at the front and back of a vehicle to utilize the streamlined shape of a vehicle.

In accordance with an embodiment, an apparatus includes a sheet having a first side ending at first and second corners, and a second side opposite the first side, the second side ending at third and fourth corners, wherein one or more first holes are arranged in the sheet proximate the first corner, one or more second holes are arranged in the sheet proximate the second corner, one or more third holes are arranged in the sheet proximate the third corner, and one or more fourth holes are arranged in the sheet proximate the fourth corner. The apparatus also includes first, second, third, and fourth connecting cords, each connecting cords comprising a respective elastic band having first and second ends, and first and second hooks attached to the first and second ends of the elastic band.

In one embodiment, the first side is shorter than the second side.

In another embodiment, the sheet has a trapezoid shape.

In another embodiment, the sheet is made of a tarp material, a polyester material, or a plastic material.

In another embodiment, the one or more first holes include a plurality of first holes arranged in one or more first rows, the one or more second holes include a plurality of second holes arranged in one or more second rows, the one or more third holes include a plurality of third holes arranged in one or more third rows, and the one or more fourth holes include a plurality of fourth holes arranged in one or more fourth rows.

In another embodiment, a sheet has four plastic hooks. In another embodiment, a sheet has four high elasticity latex tubes.

In accordance with another embodiment, a method is provided. A first sheet is placed over a front portion of a vehicle, wherein the front portion includes at least a portion of the vehicle's hood, the vehicle's front windshield, and a portion of the vehicle's roof. A plurality of first connecting cords are used to secure the first sheet to first and second front wheel wells of the vehicle and to first and second door handles of the vehicle. A second sheet is placed over a rear portion of a vehicle, wherein the rear portion includes at least a portion of the vehicle's trunk, the vehicle's rear windshield, and a portion of the vehicle's roof. A plurality of second connecting cords are used to secure the second sheet to first and second rear wheel wells of the vehicle and to third and fourth door handles of the vehicle. After snow has fallen on the vehicle, a side of the first snow removal apparatus nearest the front end of the vehicle is grasped by a user. The first snow removal apparatus is pulled at least partially off the vehicle. A side of the second snow removal apparatus nearest the rear end of the vehicle is grasped by a user. The second snow removal apparatus is pulled at least partially off the vehicle.

In one embodiment, the snow cover sheet material is reinforced polyester.

In one embodiment, the sheet has a first side ending at first and second corners, and a second side opposite the first side, the second side ending at third and fourth corners, wherein a one or more first holes are arranged in the sheet proximate the first corner, one or more second holes are arranged in the sheet proximate the second corner, one or more third holes are arranged in the sheet proximate the third corner, and one or more fourth holes are arranged in the sheet proximate the fourth corner.

In another embodiment, the first side is shorter than the second side.

In another embodiment, each of the first and second connecting cord includes a respective elastic band and first and second hooks.

In one embodiment, the sheets described herein are elastic, and have latex tube-shaped cords and hooks. In one embodiment, the cord is high elasticity latex bungee tubes.

In one embodiment, the sheets described herein, having elastic properties and latex cords and hooks, fits on passenger vehicles of all sizes as a one-size-fit-all snow removal apparatus.

These and other advantages of the present disclosure will be apparent to those of ordinary skill in the art by reference to the following Detailed Description and the accompanying drawings.

SUMMARY OF THE INVENTION

Described herein is a method of clearing snow from a vehicle, comprising: (1) placing a sheet 100 on top of a vehicle having a streamlined shape and covering the front half of said vehicle; (2) placing a sheet 100 on top of a vehicle covering the rear half of the vehicle; (3) affixing said sheets to said vehicle with one of more holes 130, cords 115, 118, and hooks 120; (4) leaving said sheets in place until snow is accumulated; and (5) pulling said sheets horizontally along the streamlined shape of said vehicle and away from said vehicle. In one embodiment, said cords are latex tube-shaped cords. In one embodiment, said hooks are hooked to the door handle of said vehicle. In one embodiment, hooks are hooked to the rods supporting headrest of said vehicle's seat.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Figure 1A:
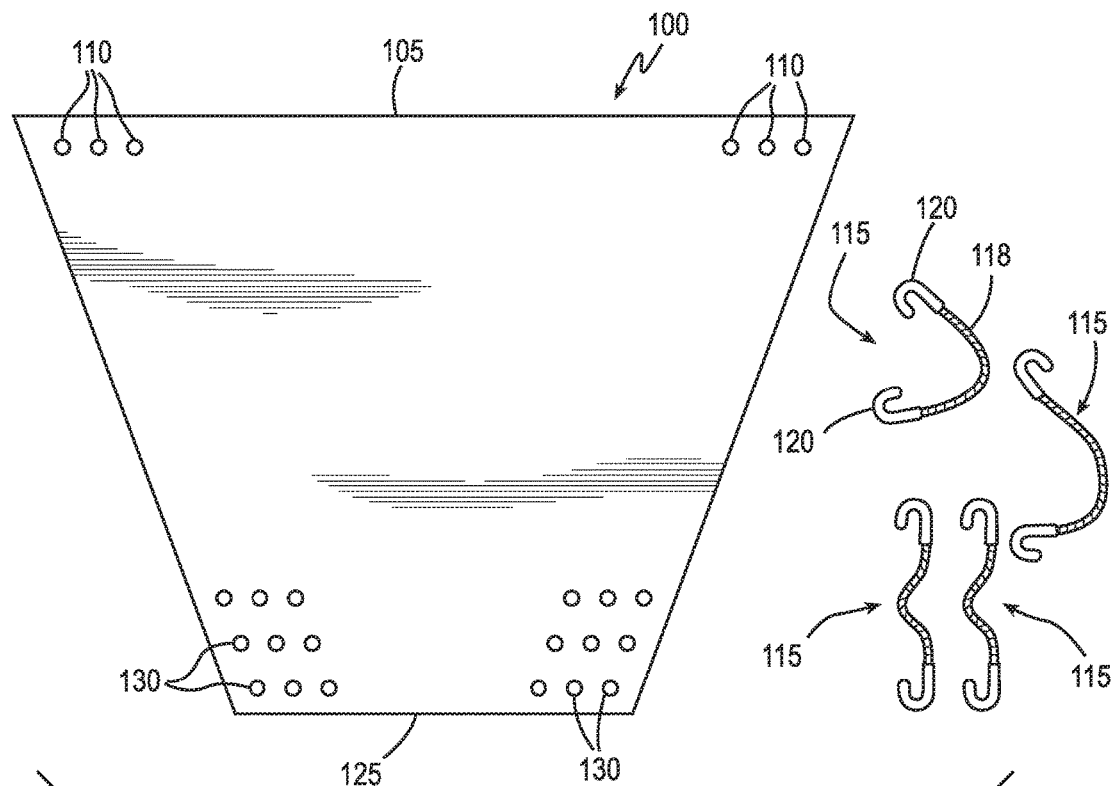
FIG. 1A shows a snow removal apparatus in accordance with an embodiment.

FIG. 1A shows a snow removal apparatus 100 in accordance with an embodiment. In the illustrative embodiment, snow removal apparatus 100 includes a sheet or a sheet-like material having a trapezoid shape or an approximately trapezoid shape. The sheet of snow removal apparatus 100 may be made of any suitable material such as a tarp material, a polyester material, plastic, etc. The sheet-like material preferably weighs about 80 gm/square inch and has a preferred thickness of about 0.1-0.2 mm. In other embodiments, a snow removal apparatus may include a sheet having other shapes.

Snow removal apparatus 100 includes a long side 105 and a short side 125. A plurality of holes 110 are disposed at each corner associated with long side 105. A plurality of holes 130 are disposed at each corner associated with short side 125. Holes 110, 130 may be eyelets, for example. Holes 130 may be arranged in multiple rows each having a plurality of holes, for example. In other embodiments, a single hole may be disposed at each corner of snow removal apparatus 100.

Snow removal apparatus 100 also includes at least four connecting cords 115. Each connecting cord 115 includes an elastic cord portion 118 and hooks 120 disposed on respective ends of elastic portion 118. Hooks 120 may be plastic hooks, for example. In one embodiment, the cords are made of latex. In another embodiment, the cords are made of latex tube-shaped cord.

Figure 1B:
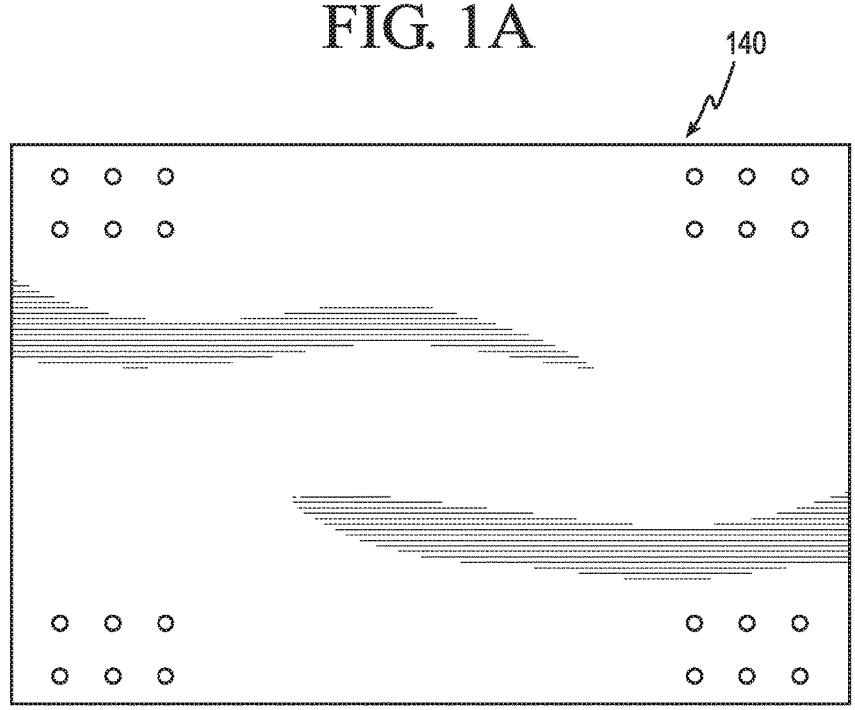
FIG. 1B shows a snow removal apparatus in accordance with another embodiment.
Figure 1C:
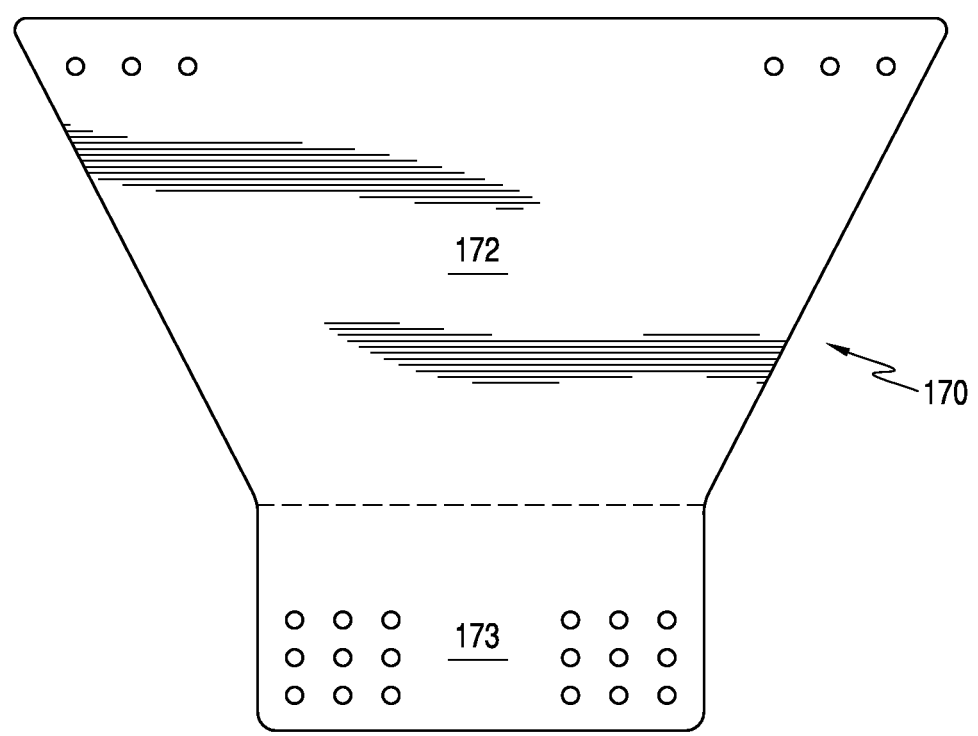
FIG. 1C shows a snow removal apparatus in accordance with another embodiment.

FIG. 1B shows a snow removal apparatus in accordance with another embodiment. In this embodiment, snow removal apparatus 140 has a rectangular shape, FIG. 1C shows a snow removal apparatus in accordance with another embodiment. In this embodiment, snow removal apparatus 170 has a first portion 172 having a trapezoid shape and a second portion 173 having a rectangular shape.

Figure 2A:
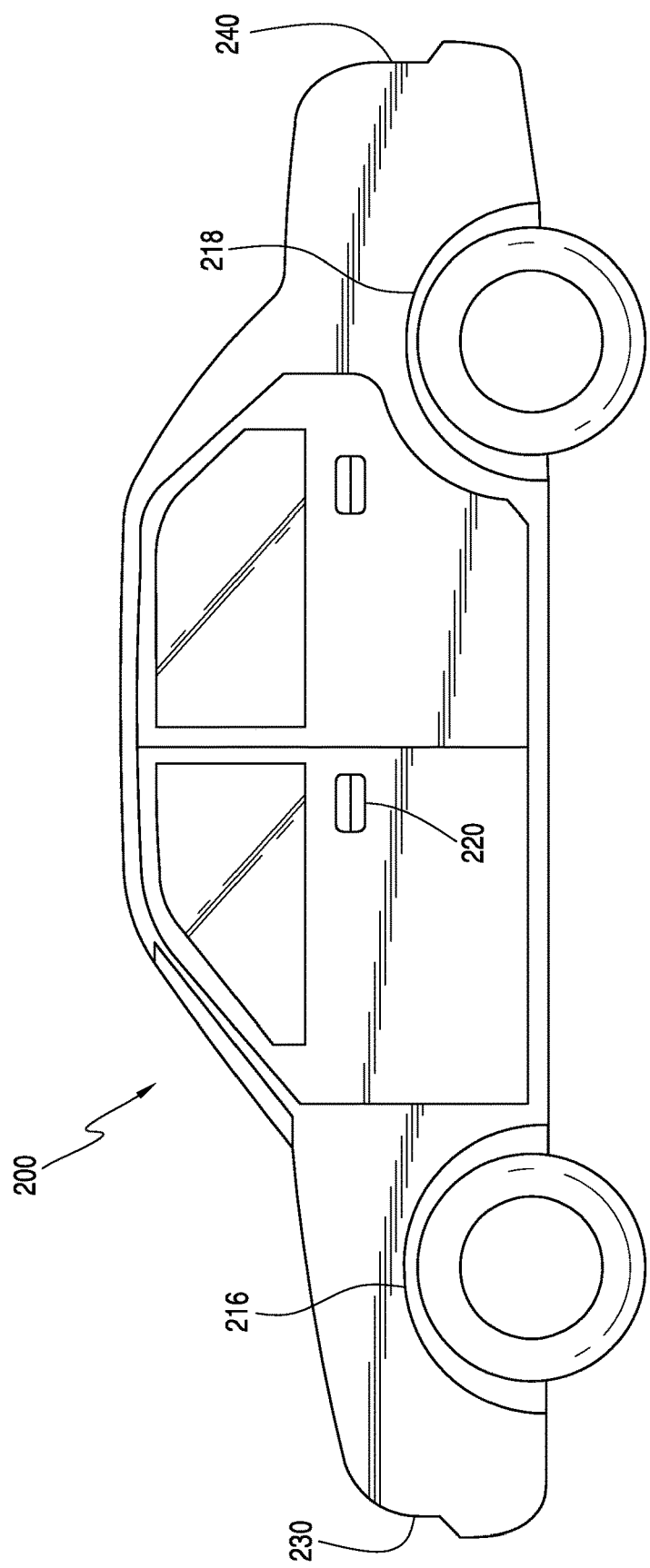
FIGS. 2A-2B show a side view and a top view of an exemplary vehicle.
Figure 2B:
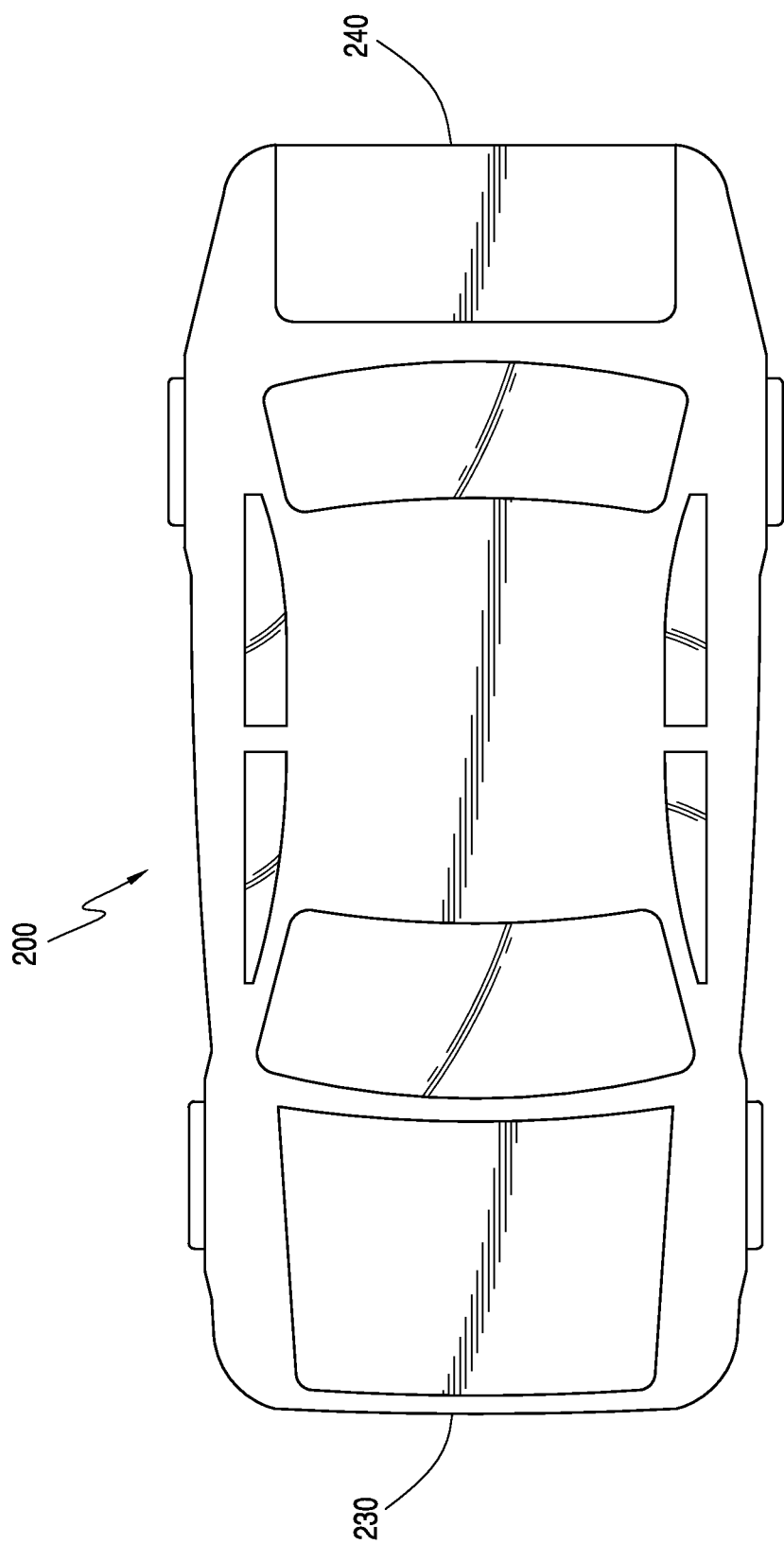

FIGS. 2A-2B show an exemplary vehicle. In the illustrative example, vehicle 200 is a car. Vehicle 200 includes components commonly found on a car, including a front end 230, a rear end 240, a front wheel well 216, a rear wheel well 218, and a door handle 220. FIG. 2A shows a side view of vehicle 200. FIG. 2B shows a top view of vehicle 200.

In accordance with an embodiment, a snow removal apparatus may be used to protect a vehicle from snow and to facilitate removal of snow from the vehicle. One or more snow removal apparatuses may be used for this purpose. In other embodiments, a snow removal apparatus 100 may be used to protect any type of vehicle, such as a truck, a sports utility vehicle, a recreational vehicle, a boat, a trailer, etc.

Figure 3A:
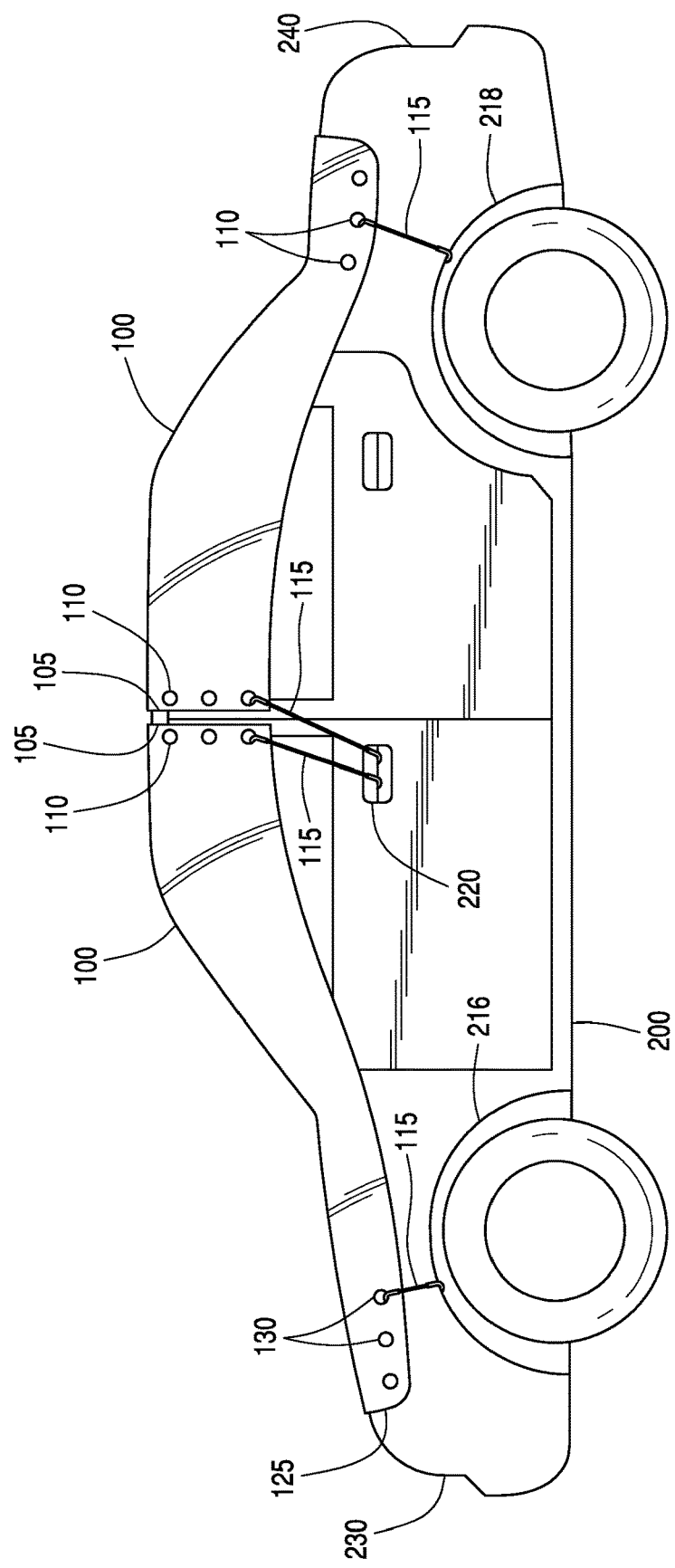
FIGS. 3A-3B show the snow removal apparatus of FIG. 1A used to cover a vehicle in accordance with an embodiment.
Figure 3B:
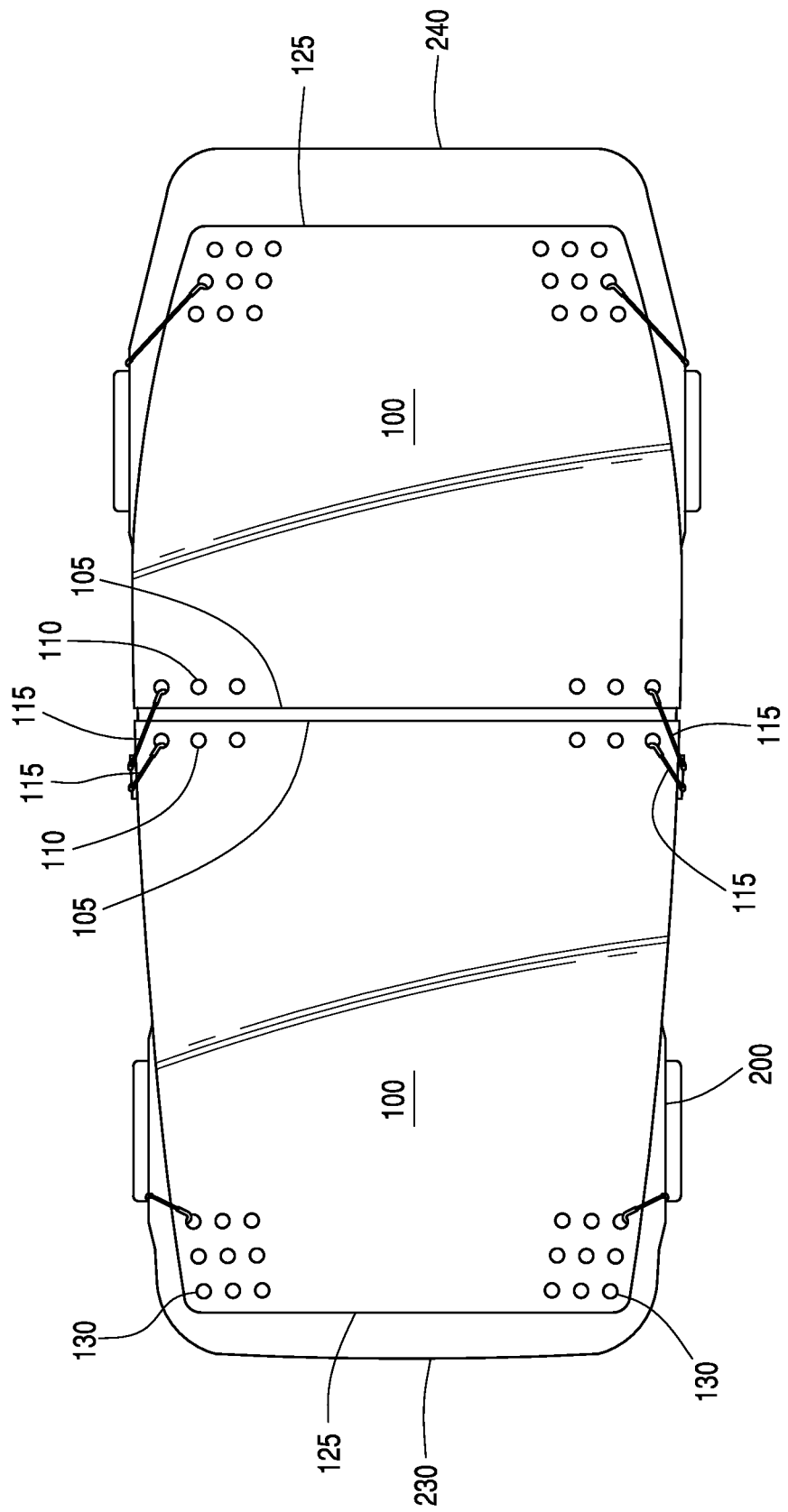

In an illustrative embodiment shown in FIGS. 3A-3B, snow removal apparatus 100 of FIG. 1A is used to cover vehicle 200, The user places the sheet of a first snow removal apparatus 100 on the front half of vehicle 200. Specifically, the sheet of snow removal apparatus 100 is draped over the front half of the vehicle, covering at least a portion of the hood, the front windshield, and the front half of the roof of the vehicle. Short side 125 of snow removal apparatus 100 is arranged on the hood of vehicle 200, approximately parallel to front end 230, such that each group of holes 130 is arranged near a front wheel of the vehicle. Long side 105 of snow removal apparatus 100 is arranged across the roof of vehicle 200, such that each group of holes 110 is arranged on or near the side of the vehicle. In this arrangement, the sheet of snow removal apparatus 100 slopes downward from the roof of vehicle 200 toward the front end of vehicle 200.

The user now uses connecting cords 115 to secure the first snow removal apparatus 100 in place on the front portion of vehicle 200. Two connecting cords 115 are used to secure short side 125 of snow removal apparatus to front wheel wells 216 of vehicle 200, and two additional connecting cords 115 are used to secure long side 105 of snow removal apparatus 100 to door handles 220 of vehicle 200.

Specifically, the user connects a first hook 120 of a first connecting cord 115 to a selected hole 130 on the front left side of vehicle 200, and the second hook 120 (on the other end) of the connecting cord 115 to the rim of the front left wheel well 216 of vehicle 200, as shown in FIG. 3A. In a similar manner, the user connects a first hook 120 of a second connecting cord 115 to a selected hole 130 on the front right side (not shown) of vehicle 200, and the second hook (on the other end) of the connecting cord to the rim of the front right wheel well (not shown) of vehicle 200.

The user now connects a first hook 120 of a third connecting cord 115 to a selected hole 110 on the middle left side of vehicle 200, and the second hook (on the other end) of the connecting cord to the door handle 220 on the left side door of vehicle 200, as shown in FIG. 3A. In a similar manner, the user connects a first hook 120 of a fourth connecting cord 115 to a selected hole 110 on the middle right side of vehicle 200, and the second hook (on the other end) of the connecting cord to the door handle (not shown) on the right side door of vehicle 200. In some embodiments, the user may connect the hooks of the connecting cords 115 to the door handle on the driver's door and to the door handle of the front passenger door; alternatively, the hooks may be secured to the door handle of the rear passenger door, The user now places the sheet of a second snow removal apparatus 100 on the rear half of vehicle 200. Specifically, the sheet of a second snow removal apparatus 100 is draped over the rear half of the vehicle, covering at least a portion of the trunk, the rear windshield, and the rear half of the roof of the vehicle. Short side 125 of snow removal apparatus 100 is arranged on the trunk of vehicle 200, approximately parallel to rear end 240, such that each group of holes 130 is arranged near a rear wheel of the vehicle. Long side 105 of snow removal apparatus 100 is arranged across the roof of vehicle 200, such that each group of holes 110 is arranged on or near the side of the vehicle.

In a manner similar to that described above, the user uses connecting cords 115 to secure the second snow removal apparatus 100 in place on the rear portion of vehicle 200. Two connecting cords 115 are used to secure short side 125 of snow removal apparatus to rear wheel wells 218 of vehicle 200, and two additional connecting cords 115 are used to secure long side 105 of snow removal apparatus 100 to door handles 220 of vehicle 200.

Figure 4:
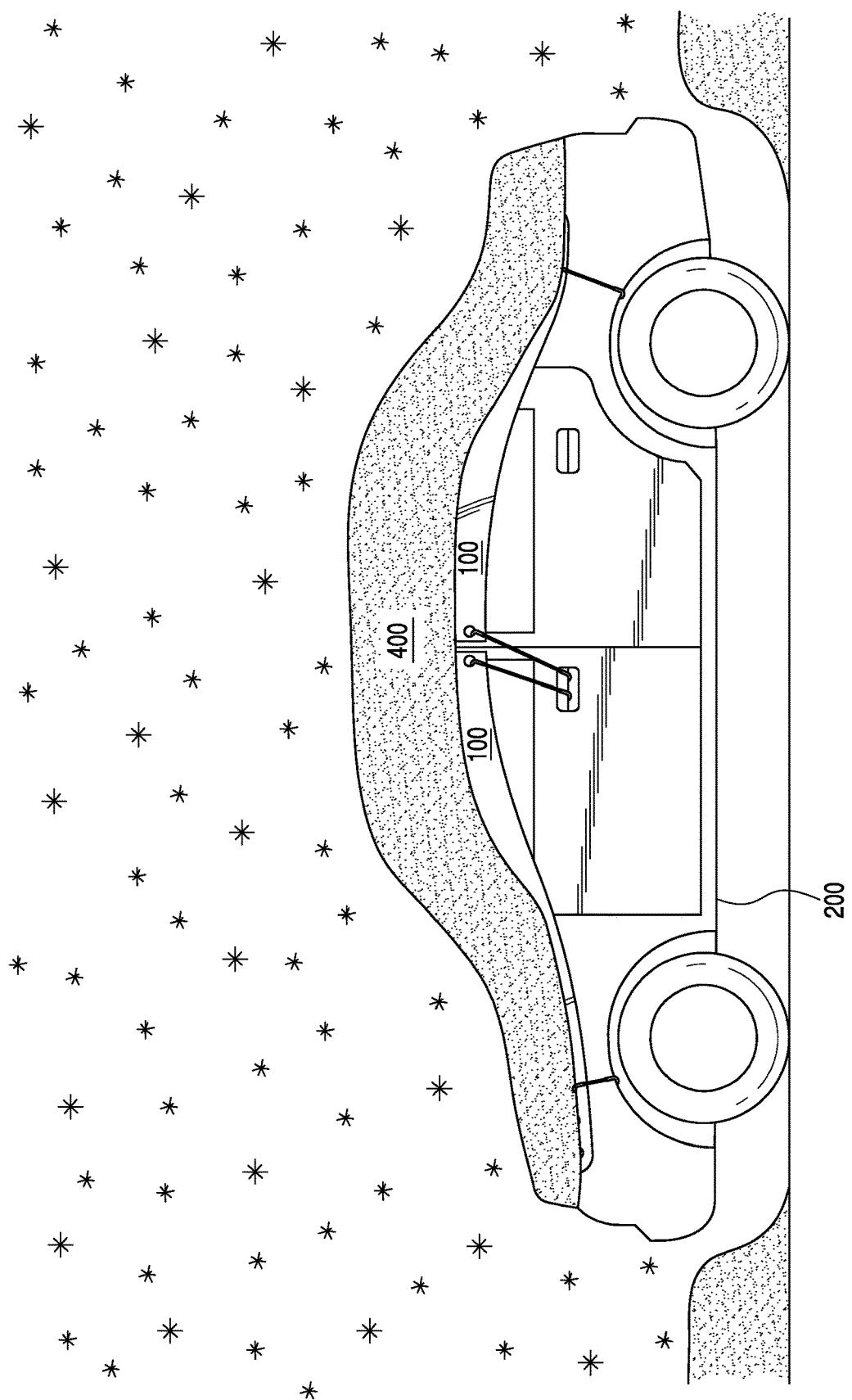
FIG. 4 shows a quantity of snow accumulating on a vehicle and snow removal apparatus in accordance with an embodiment.

Vehicle 200 is now protected during a snowstorm. FIG. 4 shows vehicle 200 during a snowstorm. When a snowstorm occurs, snow 400 falls and accumulates on the first snow removal apparatus 100 covering the front portion of vehicle 200 and on the second snow removal apparatus 100 covering the rear portion of vehicle 200. Referring to FIG. 4, a large quantity of snow 400 may accumulate on each snow removal apparatus 100 during a snowstorm.

In other embodiments, a single snow removal apparatus may be sufficient to cover and protect a small vehicle.

Figure 5:
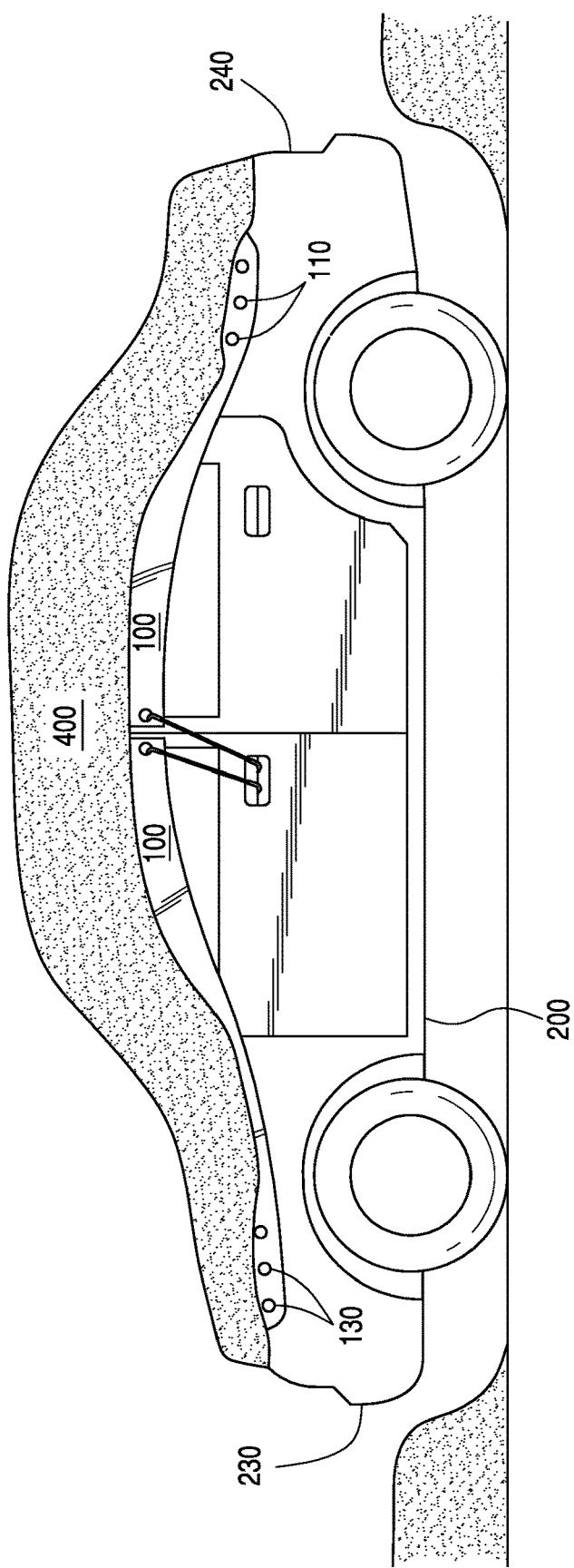
FIG. 5 shows the vehicle and snow removal apparatus of FIG. 4 after the connecting cords have been removed in accordance with an embodiment.

In accordance with an embodiment, a user may remove snow from vehicle 200 by removing each snow removal apparatus 100 from the vehicle. To remove each snow removal apparatus 100 (and snow 400) from vehicle 200, a user first removes connecting cords 115, Thus, the user removes the connecting cords 115 attached between holes 130 and front wheel wells 216 and the connecting cords attached between holes 110 and rear wheel wells 218. As shown in FIG. 5, snow removal apparatus 100 and a layer of snow 400 remain on vehicle 200.

Figure 6:
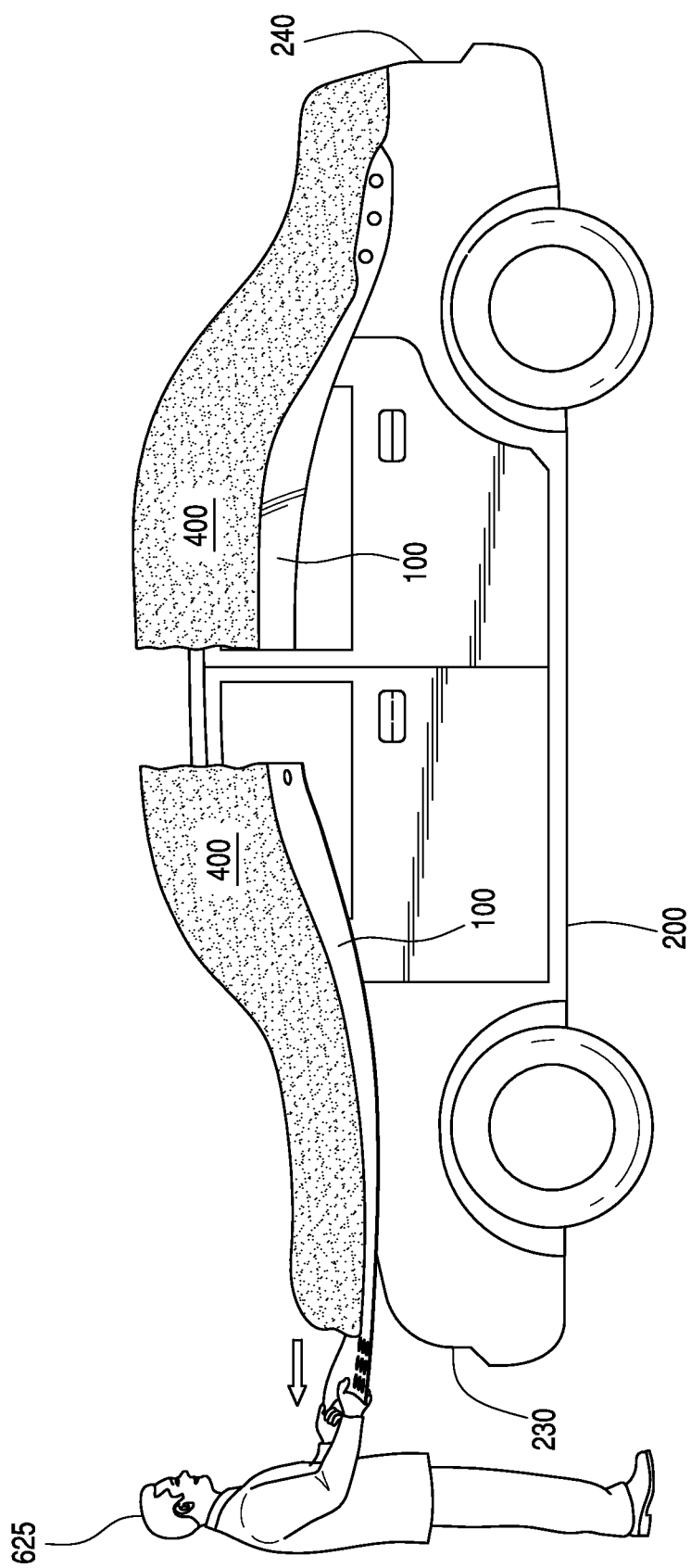
FIGS. 6-9 illustrate a method of using a snow removal apparatus to remove snow from a vehicle.
Figure 7:
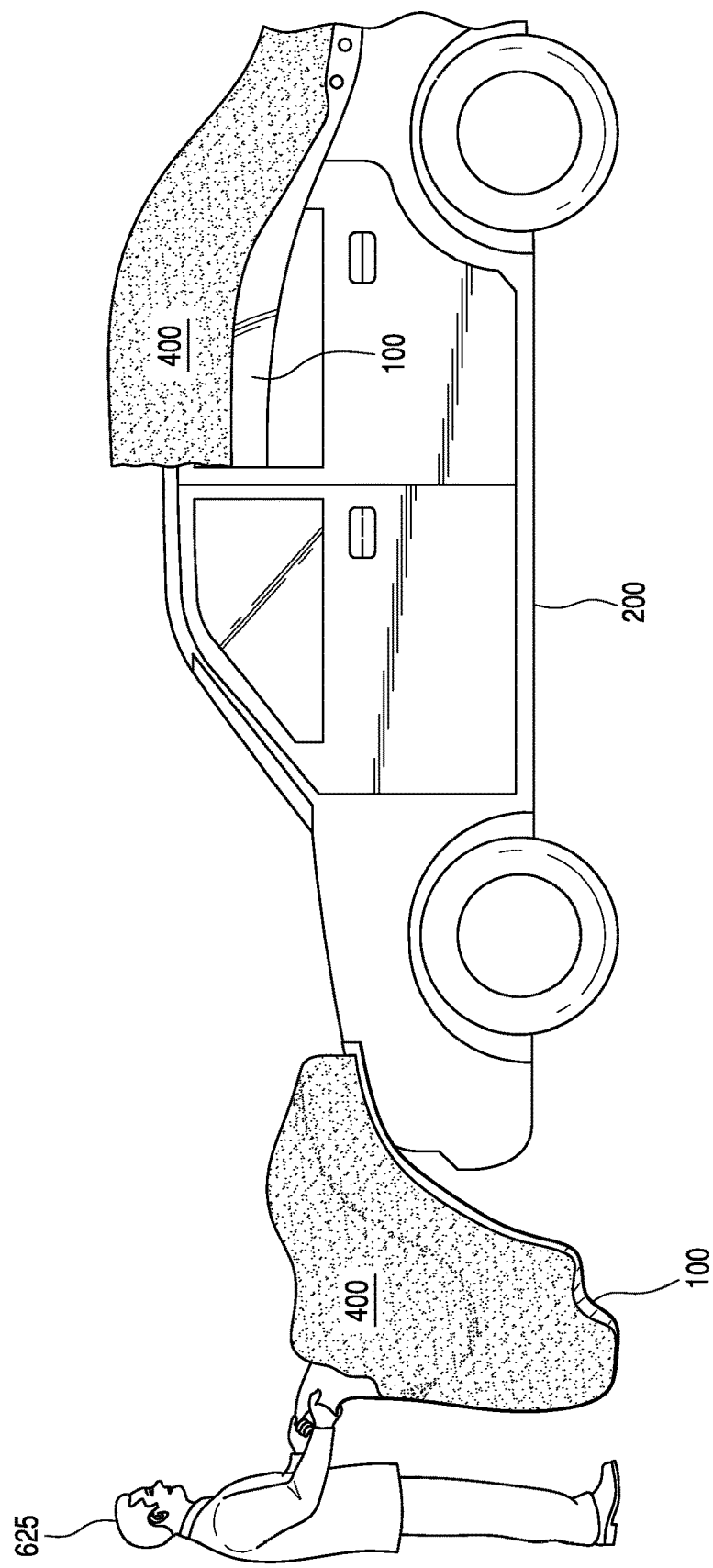
Figure 8:
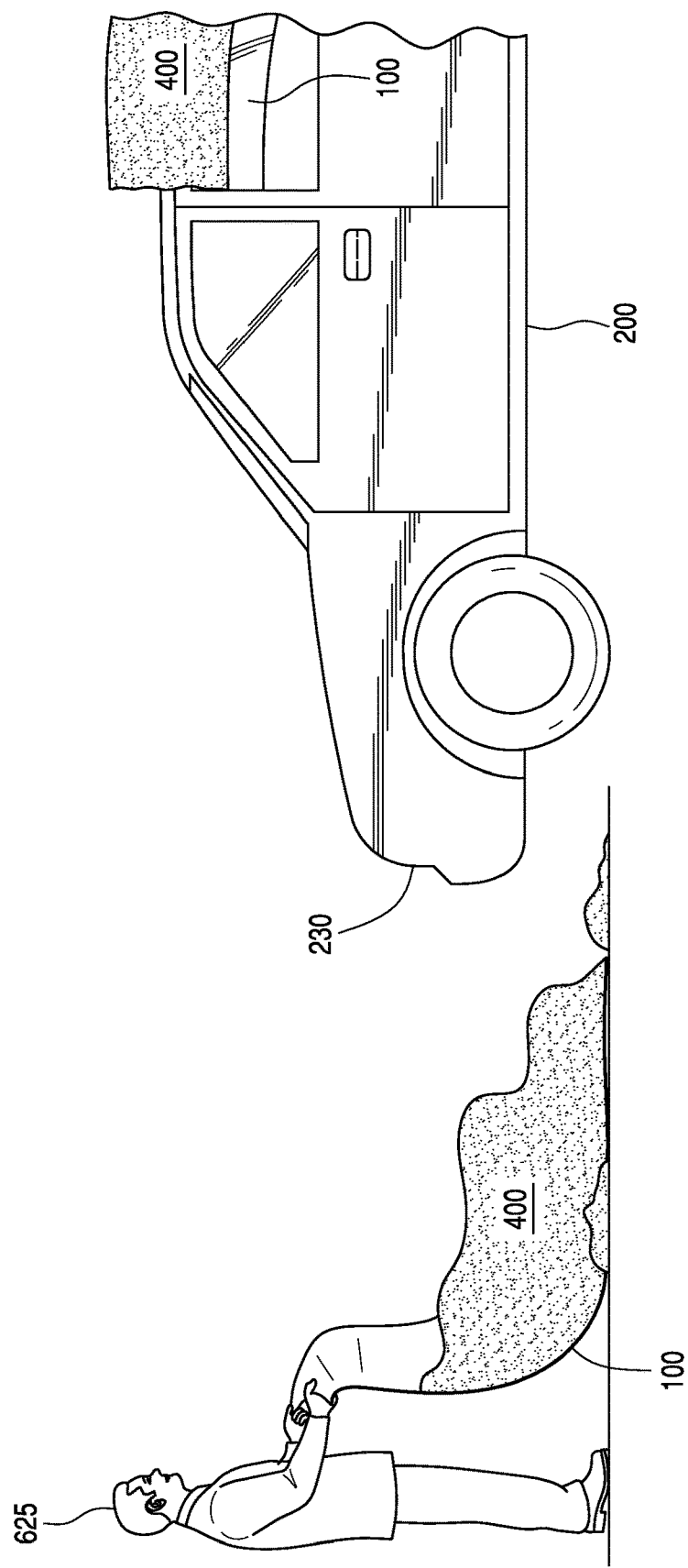

Referring now to FIG. 6, a user 625 now stands in front of vehicle (in front of front end 230), grasps the edge of snow removal apparatus 100, and pulls first snow removal apparatus 100 toward himself. Advantageously, after user 625 begins to pull snow removal apparatus 100 (and the snow thereon) toward himself, as shown in FIG. 6, the weight of snow 400 and the downward slope of the sheet covering the front portion of vehicle 200 cause the sheet of first snow removal apparatus 100 (and the snow 400 that is resting thereon) to slide down the windshield and hood of vehicle 200 toward user 625, and to fall off the vehicle, as shown in FIG. 7. Therefore, user 625 needs only to exert a slight to moderate pulling action on snow removal apparatus 100 to cause it to slide down and off of vehicle 200, as shown in FIG. 8.

Figure 9:
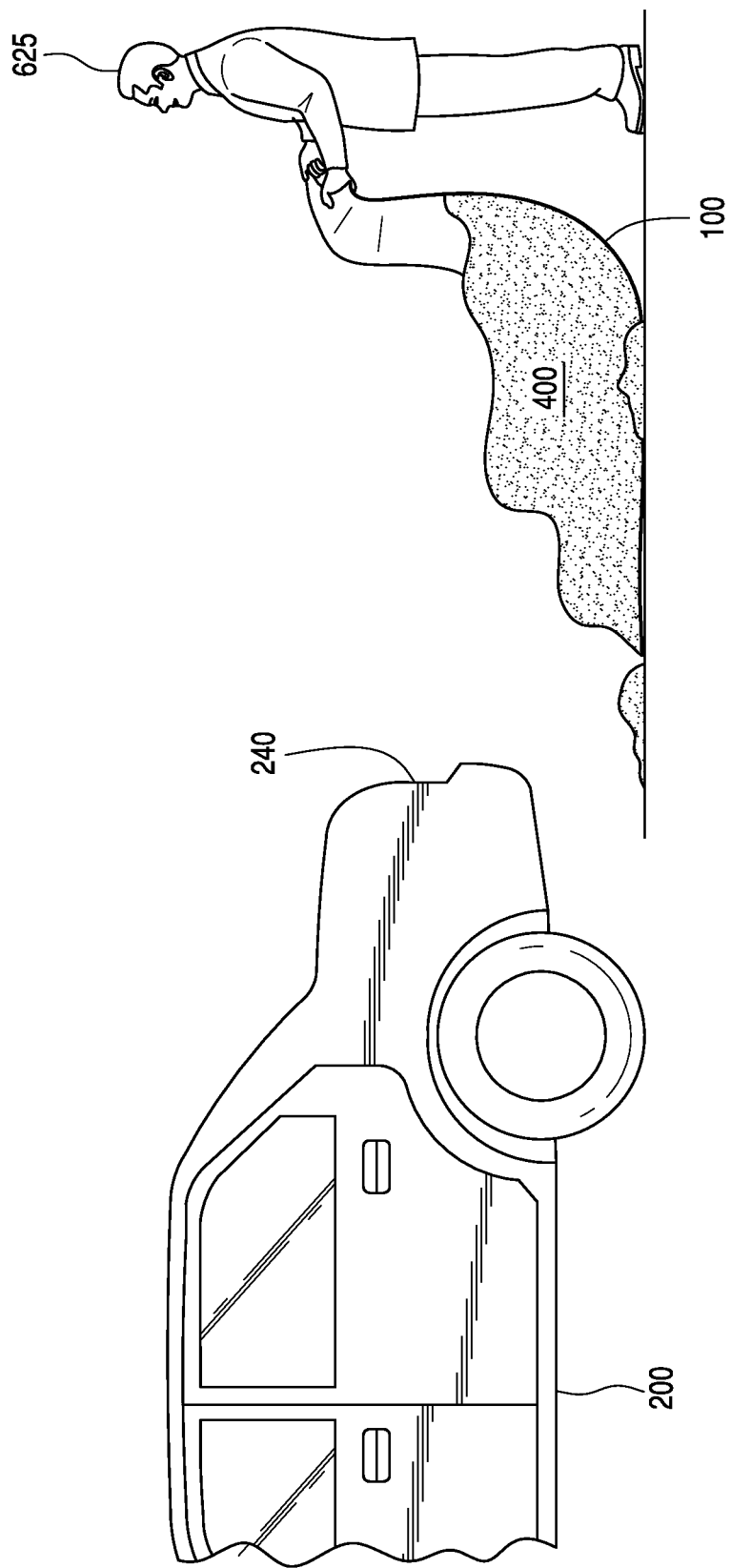

The user now moves to the rear end of vehicle 200, grasps the second snow removal apparatus 100 that covers the rear portion of vehicle 200, and pulls the second snow removal apparatus 100 (and snow 400 thereon) toward himself. In a manner similar to that described above, second snow removal apparatus 200 (and the portion of snow 400 resting thereon) slide toward user 625 and off vehicle 200, as shown in FIG. 9.

Figure 10A:
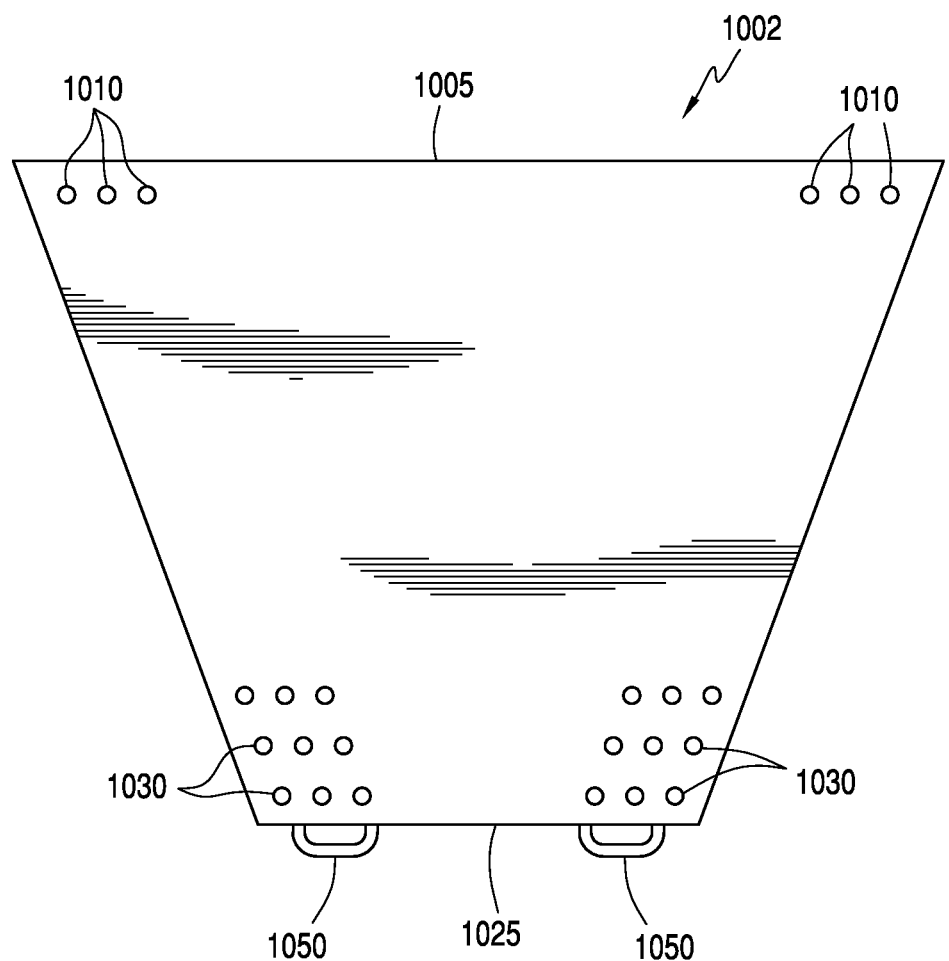
FIG. 10A shows a snow removal apparatus in accordance with another embodiment.

FIG. 10A shows a snow removal apparatus in accordance with another embodiment. Snow removal apparatus 1002 is similar to snow removal apparatus 100 of FIG. 1 and thus includes a long side 1005 and a short side 1025, and holes 1010 and 1030. Snow removal apparatus 1002 also includes handles 1050 arranged along short side 1025. A user may grasp handles 1050 when pulling snow removal apparatus 1002 off of a vehicle, for example.

Figure 10B:
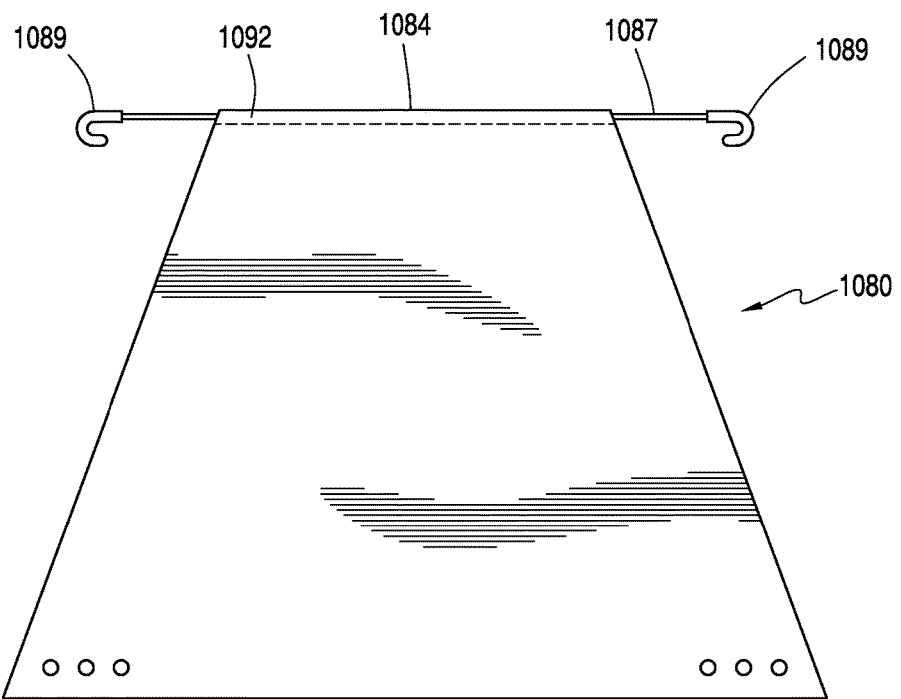
FIG. 10B shows a snow removal apparatus in accordance with another embodiment.

FIG. 10B shows a snow removal apparatus in accordance with another embodiment. In this embodiment, snow removal apparatus 1080 is similar in shape to snow removal apparatus 100 shown in FIG. 1, Thus, snow removal apparatus 1080 has a trapezoidal shape with a short side 1084 and a long side 1086. Snow removal apparatus 1080 also includes a tubular portion 1092 along short side 1084. Tubular portion 1092 may be constructed by sewing an additional layer of material onto the sheet of the snow removal apparatus, for example. A single elastic cord 1087 is disposed in and runs through the length of tubular portion 1092. The respective ends of elastic cord 1087 extend from the respective ends of tubular portion 1092, Hooks 1089 are disposed at the respective ends of elastic cord 1087. Hooks 1089 may be used to secure the snow removal apparatus 1080 to a vehicle, for example. Separate elastic cords and hooks may be used to secure the corners associated with long side 1086 to the vehicle. While snow removal apparatus 1080 as illustrated in FIG. 10B has a trapezoidal shape, the snow removal apparatus may have a rectangular shape, or any other suitable shape.

Figure 10C:
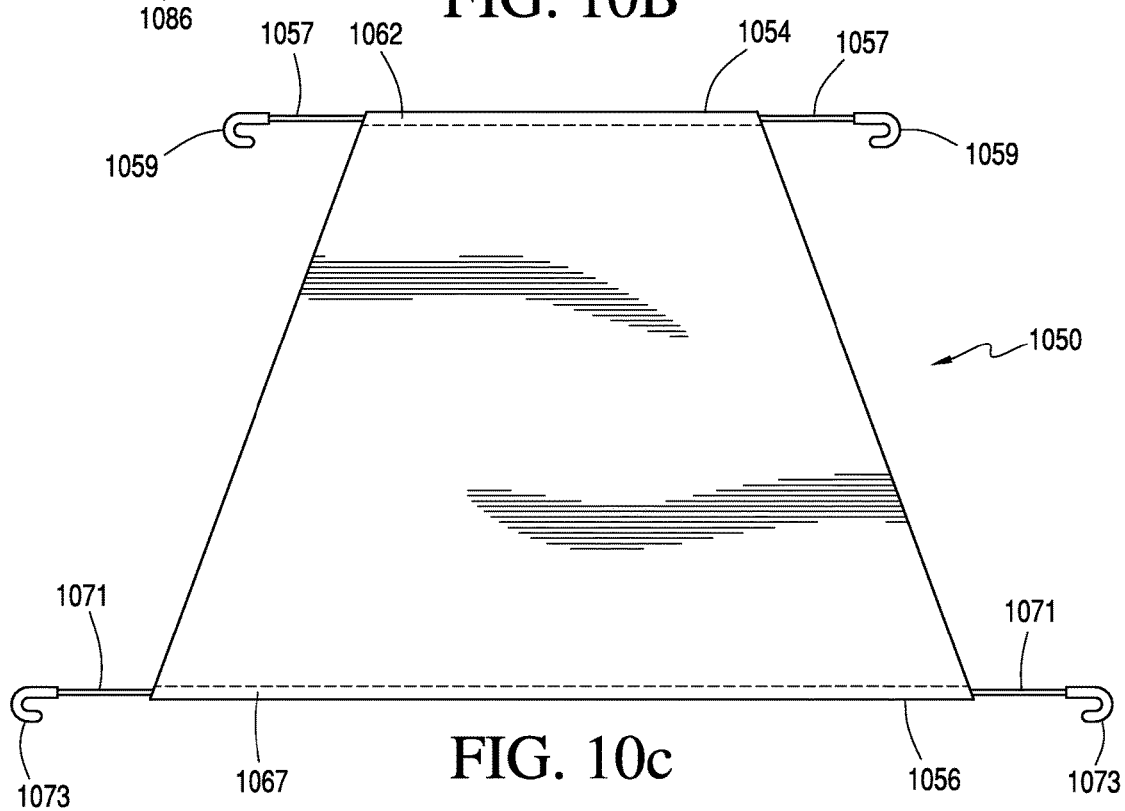
FIG. 10C shows a snow removal apparatus in accordance with another embodiment.

FIG. 10C shows a snow removal apparatus in accordance with another embodiment. In this embodiment, snow removal apparatus 1050 is similar in shape to snow removal apparatus 100 shown in FIG. 1. Thus, snow removal apparatus 1050 has a trapezoidal shape with a short side 1054 and a long side 1056 Snow removal apparatus 1050 also includes a first tubular portion 1062 along short side 1054, and a second tubular portion 1067 along long side 1056. Each tubular portion 1062, 1067 may be constructed by sewing an additional layer of material onto the sheet of the snow removal apparatus, for example. A first elastic cord 1057 is disposed in and runs through the length of first tubular portion 1062. The respective ends of first elastic cord 1057 extend from the respective ends of first tubular portion 1062. Hooks 1059 are disposed at the respective ends of first elastic cord 1057. A second elastic cord 1071 is disposed in and runs through the length of second tubular portion 1067. The respective ends of second elastic cord 1071 extend from the respective ends of second tubular portion 1067. Hooks 1073 are disposed at the respective ends of second elastic cord 1071. Hooks 1059, 1073 may be used to secure the snow removal apparatus 1050 to a vehicle, for example. While snow removal apparatus 1050 as illustrated in FIG. 10C has a trapezoidal shape, the snow removal apparatus may have a rectangular shape, or any other suitable shape.

Figure 11:
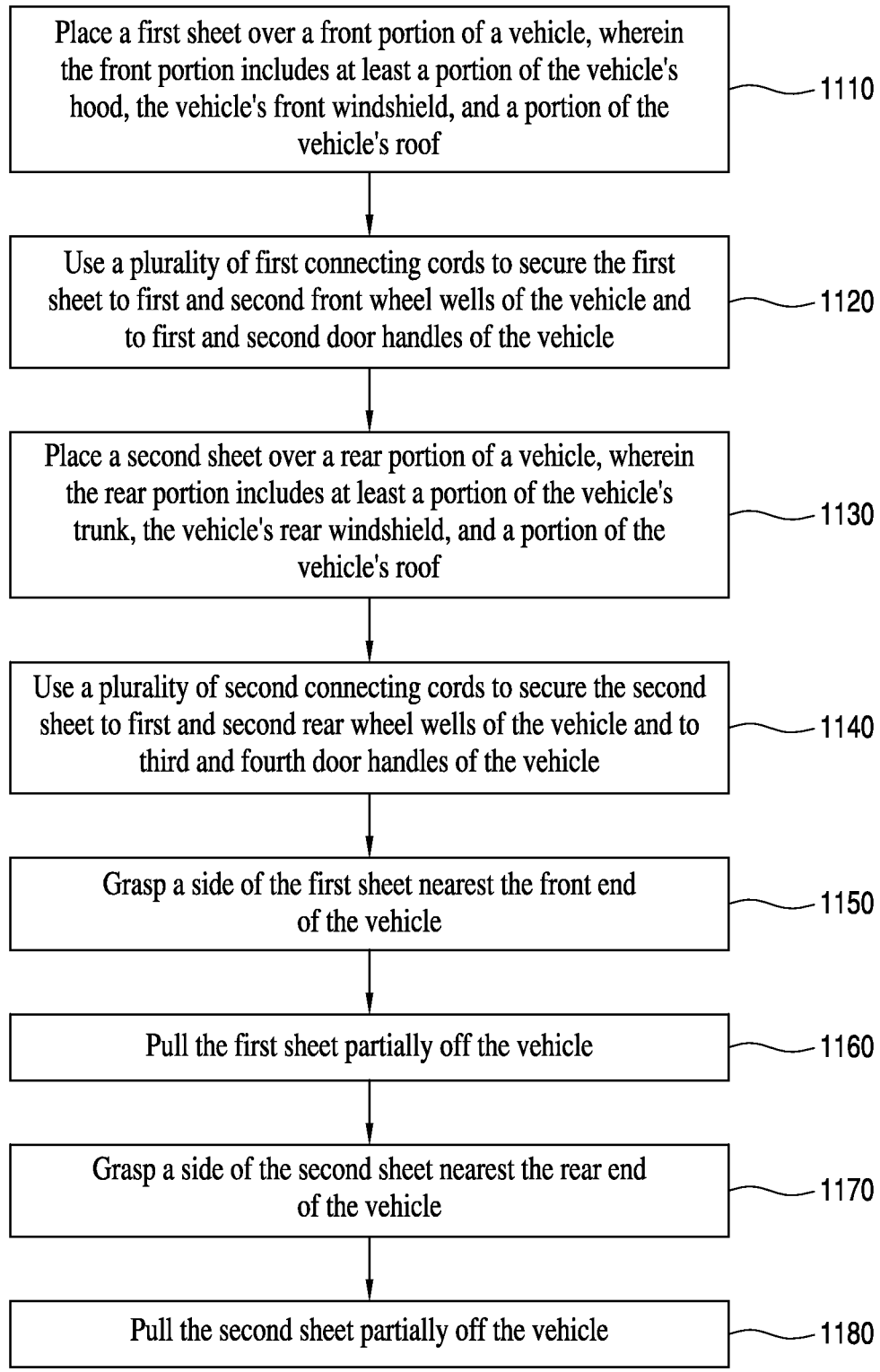
FIG. 11 is a flowchart of a method of using a snow removal apparatus in accordance with an embodiment.
Figure 12:
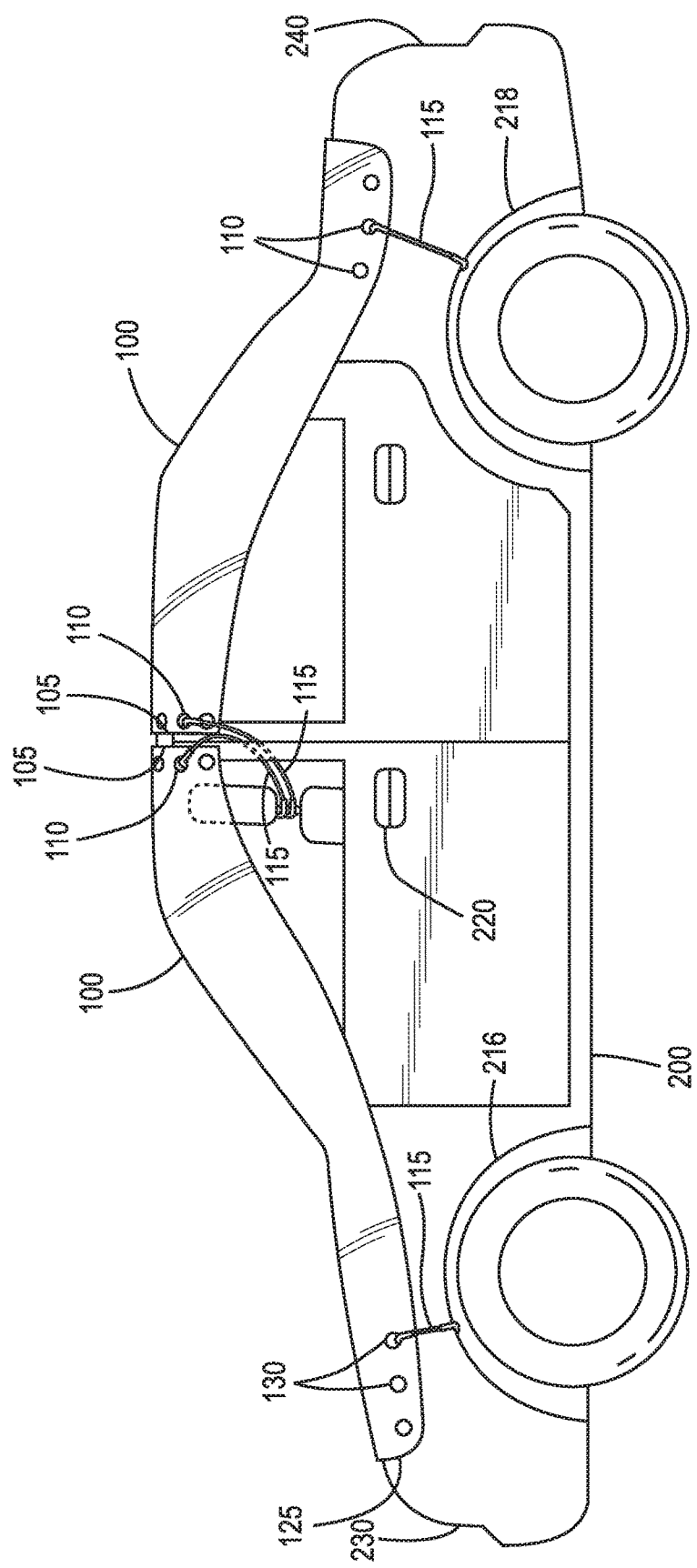
FIG. 12 shows the snow removal apparatus of FIG. 1A used to cover a vehicle in accordance with an embodiment.

FIG. 11 is a flowchart of a method of using a snow removal apparatus in accordance with an embodiment. The steps described in FIG. 11 may be performed in an order different from that shown.

At step 1110, a first snow removal apparatus is placed over a front portion of a vehicle, wherein the front portion includes at least a portion of the vehicle's hood, the vehicle's front windshield, and a portion of the vehicle's roof.

At step 1120, a plurality of first connecting cords is used to secure the first sheet to first and second front wheel wells of the vehicle and to first and second door handles of the vehicle.

At step 1130, a second snow removal apparatus is placed over a rear portion of a vehicle, wherein the rear portion includes at least a portion of the vehicle's trunk, the vehicle's rear windshield, and a portion of the vehicle's roof.

At step 1140, a plurality of second connecting cords is used to secure the second sheet to first and second rear wheel wells of the vehicle and to third and fourth door handles of the vehicle.

After a snowfall, the connecting cords are removed, as described above.

At step 1150, a side of the first sheet nearest the front end of the vehicle is grasped by a user. At step 1160, the first sheet is pulled partially off the vehicle. As described above, after the first snow removal apparatus is pulled partially from the vehicle, the weight of the snow on the first sheet causes the first sheet (and the snow) to slide down toward the front end of the vehicle, and to fall off the vehicle.

At step 1170, a side of the second sheet nearest the rear end of the vehicle is grasped by a user. At step 1180, the second sheet is pulled partially off the vehicle. As described above, after the second sheet is pulled partially from the vehicle, the weight of the snow on the second sheet causes the second sheet (and the snow) to slide down toward the front end of the vehicle, and to fall off the vehicle.

EXAMPLES

Example 1. Calculation of the Weight of Snow

Snow has about one tenth the density of liquid water. 1 liter (L) is 0.001 cubic meter. 1 L of water weighs 1 kg. Thus, 1 square meter of space that is 1 mm deep would be occupied by 1 L of water, which would weigh 1 kg. The same space occupied by snow would weigh one tenth of water's weight, and thus, 100 grams.

Example 2. Calculation of the Weight of Snow on Automobile

The roof of an automobile has a surface area of 3 $m^2$. The snow fallen on the roof is 50 cm deep. The weight of the snow is 3 $m^2$×500 mm×0.1=150 kg.

Example 3. Clearing 1,320 Pounds of Snow Accumulated on a Vehicle

A vehicle is covered with a snow removal apparatus 100. The covered area is about 12 $m^2$. The depth of the snow fallen on the covered area is about 50 cm. The calculated weight of the snow is, according to Examples 1 and 2, about 600 kg. 600 kg is about 1,320 pounds. A person approaches the vehicle, holds one side of the snow removal apparatus 100, and pulls it horizontally while taking a few steps away from the vehicle. The pulling force is about 23 kilogram-force. The person approaches the vehicle from behind, holds one side of the snow removal apparatus 100, and pulls it horizontally while taking a few steps away from the vehicle. The snow slides off the vehicle with the snow removal apparatus 100 and falls to the ground. The removal of snow takes about 3 minutes.

Example 4. Clearing 1,320 Pounds of Snow Accumulated on a Streamline Shaped Vehicle A vehicle is covered with a snow removal apparatus 100. The covered area is about 12 $m^2$. The depth of the snow fallen on the covered area is about 50 cm. The calculated weight of the snow is, according to Examples 1 and 2, about 600 kg. 600 kg is about 1,320 pounds. The vehicle has a streamline shape. A person approaches the vehicle, holds one side of the snow removal apparatus 100, and pulls it horizontally while taking a few steps away from the vehicle. The person approaches the vehicle from behind, holds one side of the snow removal apparatus 100, and repeats the process. The snow slides off the vehicle with the snow removal apparatus 100 and falls off to the ground. The removal of snow takes about 1 minute.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of clearing snow from a vehicle, comprising:
   a. Placing a sheet (100) having four holes on top of a vehicle having a streamlined shape and covering the front half of said vehicle;
   b. Placing a sheet (100) having four holes on top of said vehicle covering the rear half of the vehicle;
   c. Affixing both said sheets to said vehicle by connecting each hole (130) with a cord (115) (118), and a hook (120) wherein said hooks are hooked to rods supporting head rest of said vehicle's seat and wheel wells (216) (218);
   d. Leaving both said sheets in place until snow is accumulated;
   e. Unhooking all hooks from said vehicle; and
   f. Pulling each said sheet covering the front half or the rear half of said vehicle horizontally along the streamlined shape of said vehicle and away from said vehicle.

* * * * *